Patented June 29, 1954

2,682,490

UNITED STATES PATENT OFFICE 2,682,490

ADHESIVES AND ARTICLES UNITED THEREWITH

Alphonse Gams and Wilhelm Kraus, Basel, Eduard Preiswerk, Riehen, Gustav Widmer, Basel, and Werner Wieland, Riehen, Switzerland, assignors to Ciba Limited, Basel, Switzerland, a Swiss firm No Drawing. Application October 20, 1947, Serial No. 781,010

Claims priority, application Switzerland October 25, 1946

12 Claims. (Cl. 154—43)

The present invention relates to improvements in a method of adhesively uniting materials, adhesives therefor, as well as articles united therewith.

It has been proposed in application Ser. 680,860, filed July 1, 1946 (now abandoned), to adhesively unite materials, especially metals, by heating to fusion a fusible and hardenable mixture which contains, as essential constituents, an ethylene oxide derivative of a phenol, which derivative contains at least 2 ethylene oxide groups, and a hardening agent, and subjecting the mixture to hot hardening between the surfaces to be united.

The process of application Ser. No. 761,150, filed July 15, 1947 (now abandoned), according to which a hardenable mixture, spreadable at ordinary temperature, of a like resinous ethylene oxide derivative and a hardening agent is interposed at ordinary temperature between the cold surfaces to be united, and is then subjected to hot hardening, obviated the disadvantage of the previous process that it was necessary, prior to the adhesion step proper, to heat the adhesive to convert it into a thinly fluid melt and/or to heat the surfaces to be united prior to the application of the adhesive.

In both processes the hardening involves the use of heat, which excludes the adhesive union of heat-sensitive materials, and for technical reasons renders doubtful the adhesive union of very large articles which can not be introduced into a furnace of normal size or of articles which are adhered outdoors.

The present invention relates to a further development in the aforedescribed processes, which is characterized by the fact that a mixture which is spreadable and hardenable at room temperature and which contains, as essential components, a resinous ethylene oxide derivative of a phenol, which derivative carries at least two ethylene oxide groups, a non-volatile solvent for the ethylene oxide derivative and a fluid hardening agent, is interposed at room temperature between the cold surfaces to be united and is then allowed to harden at room temperature. By room temperature there is generally understood a range of temperature between 10–40° C., preferably 15–30° C.

Mixtures, for use according to the invention, which are spreadable and hardenable at ordinary temperature, may advantageously be obtained by dissolving the ethylene oxide derivative in the non-volatile solvent and then adding to the resultant resin solution the fluid hardening agent, the latter being homogeneously miscible therewith. If the dissolution of the resin involves an elevated temperature, it is necessary to cool the solution before adding the hardening agent.

The described procedure has been found to be very practical. However, it is possible to make various changes therein. Care must be taken that, at the moment of application, the mixture of resin, non-volatile solvent and fluid hardening agent is in such condition that it is capable of filling out the minutest irregularities in the surfaces of the materials to be united, i. e. glued together. Mixtures which are too thickly viscous generally yield joints of low shear strength. Depending upon the properties of their components, it may be advantageous to cool the mixtures when working them up on hot days and to heat them on cold days.

As resinous ethylene oxide derivatives of phenols, which can be employed for the process according to the invention, the still spreadable or solid products enumerated in the introductorily mentioned patents, may be used.

These are the ethylene oxide derivatives of phenols which contain at least two hydroxyl groups. Especially suitable are resinous ethylene oxide derivatives of polynuclear phenols, of which the nuclei are connected together by a bridge, for example of a 4:4'-dihydroxydiphenyl-methane such as 4:4'-dihydroxydiphenyl-methane, 4:4'-dihydroxydiphenyl-methylmethane and 4:4'-dihydroxydiphenyl-dimethylmethane, hereinafter referred to briefly as methane, methylmethane and dimethylmethane resins, respectively. Of these, the latter give the best results and are therefore preferred. The others, however, also give satisfactory results.

Use may also be made of ethylene oxide derivatives which have been pre-polymerized as far as possible, for example, by thermal treatment with suitable hardening agents, including also solid hardening agents, in presence of the non-volatile solvent, and which have not completely lost the consistency which enables them to be spread at room temperature. Mixtures of different types of ethylene oxide resins may also be used. Thus, for example, it is possible to obtain mixtures of useable viscosity by the addition of ethylene oxide-rich types, which per se are smeary, to harder types.

As fluid hardening agents, it is suitable to use all compounds, such as liquid polyamines or the liquid products obtainable therefrom by heating with dicyandiamide or aromatic amines with splitting off of ammonia, which are liquid at room temperature and which are capable of reacting with the ethylene oxide resins at more than one position of their molecule under the conditions of the process, that is at room temperature and in the presence of the non-volatile solvent. Solutions of solid hardening agents in non-volatile solvents are to be regarded for the purposes of the present invention as fluid hardening agents. Substances which crystallize at low temperatures, for example, in winter, but become liquid again upon being warmed to room temperature such for example as ethylenediamine or triethylenetetramine, are regarded as liquid for the purposes of the present invention. They or mixtures prepared therewith much, if necessary, be heated to room temperature before working up. As particularly useful there have been found: triethylenetetramine and the thickly viscous liquid obtained therefrom by heating with dicyandiamide or p-phenylenediamine with splitting off of ammonia. Ethylenediamine also gives results which are useful for many purposes. In many cases, it has been found to be advantageous to add an alkaline contact agent, for example caustic soda, to the liquid hardening agent.

The fluid hardening agents are used in amounts of approximately 5–20% of the weight of the ethylene oxide resin to be used. Within these quantitative limits the larger quantities generally harden more rapidly than small quantities but reduce the period of keeping (pot-life) of the adhesive. Quantities appreciably above 20% practically do not harden any more. It is possible for the expert, by suitable selection of the proportions, to prepare mixtures which correspond to any desired practical requirements with respect to hardening and keeping period.

As non-volatile solvents in the sense of the present invention, use may be made of substances which are liquid at room temperature, which are capable of keeping the ethylene oxide resin in solution at such temperature, and which do not react with the fluid hardening agents according to the invention in such manner as to impair their hardening action. Liquid esters of polybasic acids such as phthalic acid, adipic acid, methyladipic acid, phosphoric acid or the like have been found to be particularly useful, for example dibutylphthalate, methylcyclohexanol ester of methyladipic acid, tricresyl phosphate, etc. In addition, liquid toluenesulfonic acid derivatives such, for example, as the solvent and softening agent which is found on the market under the trade name "Plastomoll P," are also suitable. It is evident that there is a wide range of substances which fulfill the mentioned requirements and are more or less adapted for the purpose in view. The expert will have no particular difficulty in making the optimum selection for any particular case. Care has to be taken, however, to assure a homogeneous hardening at room temperature, i. e. there should be no separation between the hardened resin and non-volatile solvent (no sweating). The appearance of turbidity, to a greater or less extent, during the hardening is not injurious. It is also possible and within the scope of the present invention temporarily to add volatile solvents or diluents for the purpose of enhancing spreadability, but such solvent or diluent must be removed by evaporation prior to the hardening. It is also to be taken into account that the choice and quantity of non-volatile solvent affects the spreadability and period of keeping of the adhesive.

The spreadable mixtures, i. e. the finished adhesives, may be applied depending upon their composition within a period of ½–4 hours with a spatula, brush, roller, or other suitable means onto the surfaces to be united and then hardened at room temperature between the said surfaces. Depending upon circumstances, it may be necessary to heat the mixture to room temperature prior to application thereof or to make the application to suitably preheated surfaces, or it may be necessary to cool the mixture or surfaces to be joined to room temperature.

Hardening takes place at room temperature after several hours so that the clamps which may initially be used to hold the parts together may be released. After 24 hours, the joint attains a shear strength value of about 1 kg./mm.$^2$ (kilogram per square millimeter), or more. Further hardening generally results in an increase in this value. At low temperature, hardening generally takes longer than at higher temperatures. The hardening period, moreover, also varies in accordance with the adhesive agent components and the substances to be adhesively joined. Pressure during the hardening is not necessary, but may be used. Optimum shear strength values are realized with aluminium and iron.

The materials to be adhesively united, that is, glued together, according to the present invention must be carefully prepared. It is particularly advantageous to roughen the surfaces thereof, for example by means of emery paper, sand blast, scrapers or the like. It is also possible to subject them to pickling or other suitable surface treatment. In the adhesive joining of metals, it may be advantageous to preliminarily oxidize or to phosphatize the metallic surfaces to be joined or otherwise to provide them with a native or applied rough, porous or spongy layer. For example, the metal surfaces may be provided with a hot hardened lacquer coating and then be subjected to the process according to the invention directly or after roughening. The formed layer should of course, be of a character which adheres securely to metal such for example as aluminum and iron. In this way shear strengths may be attained which are higher than in the case of untreated material.

Within the conditions of the process according to the invention, various modifications are possible with respect to choice and proportions of ethylene oxide resins, the fluid hardening agents and the non-volatile solvents as well as with respect to the method of preparation and manipulation, and the expert will have no difficulty in taking advantage of these variants which therefore come within the scope of the present invention.

Processes for adhesively joining materials at room temperature are known. They involve the use of solutions of adhesives which remain thermoplastic and from which the solvent must, at least for the most part, be removed by evaporation prior to the adhesion operation proper.

In contradistinction to these known adhesives, the adhesive agents according to the invention lose their solubility and fusibility upon standing.

The following examples illustrate the invention in greater detail, but are intended to be illustrative and not limitative. In the absence of contrary indications, the parts joined together, and subjected to shear strength tests, were aluminum sheets of 13 cm. length, 2.5 cm. width and 0.1 cm. thickness with an overlap of 1.0–1.3 cm., and the hardenings were carried out at room temperature. For adhesively joining materials of

Example 1

Into a mixture, containing approximately 2 mols of gylcerine dichlorhydrin and about 7.5 mols of water for each 1.1 mol of dihydroxydiphenylpropane, 4.3 mols of caustic soda in the form of a 30% aqueous solution are allowed to run in within a period of 1 hour at 80–90° C. while stirring and with reflux cooling, and condensation is then continued at 90–92° C. until a test specimen of the resin, washed neutral, is of breakable hardness in the cold, which is the case after about 1 hour. The resin is washed free of alkali and salts and is freed of water by heating to 170° C.

Example 2

60 parts by weight of ethylene oxide resin prepared according to Example 1 are dissolved in 40 parts by weight of dibutylphthalate by heating.

(a) 10 parts by weight of this solution are homogeneously admixed with 0.4 part by volume of triethylenetetramine. This mixture must be worked up within about 2½ hours at room temperature since otherwise it loses its spreadability. The solution can be well applied with a brush. After 24 hours, shear strengths of about 0.93 kg./mm.$^2$ are attained.

(b) 0.8 part by volume of triethylenetetramine is added to 10 parts by weight of the ethylene oxide resin solution. Capacity for working up lasts for about 2 hours. Joints produced therewith attain after 24 hours shear strengths of After-condensation is continued for 5–10 minutes.

Example 3

10 parts by weight of the resin according to Example 1 are dissolved by heating in 4 parts by weight of tricresylphosphate. After cooling, 0.4 part by weight of ethylenediamine is added and the resultant adhesive agent is, within about ¾ hours, introduced between the aluminum sheets to be adhesively united. Shear strengths of about 1 kg./mm.$^2$ are attained.

Example 4

10 parts by weight of the resin prepared according to Example 1 are dissolved by heating in 4 parts by weight of dibutylphthalate. After cooling, 1 part by weight of hexamethylenediamine is dissolved by intimate stirring in the solution, and the product is used for adhesively uniting aluminum sheets. Shear strengths of about 1 kg./mm.$^2$ are attained.

Example 5

Into a mixture containing 2 mols of dichlorhydrin and 10 mols of water for each 1.3 mols of dihydroxydiphenylpropane, 4.4 mols of caustic soda in the form of a 30% aqueous solution are allowed to run in within a period of ¾ hour at 60° C. while stirring and with reflux cooling. After-condensation is continued for 5–10 minutes. The resultant very viscous resin is immediately washed free of salts and alkali by continued stirring or kneading with water to which some acetic acid has been added, and is finally dried by heating at 130° C. The resultant resin is of breakable hardness at room temperature.

Example 6

8.4 parts by weight of dicyandiamide are heated with 29.2 parts by weight of triethylenetetramine while stirring and with reflux cooling in an oil bath successively for 3 hours at 150° C., then 1 hour at 150–200° C. and 1 hour at 200° C. and finally another ½ hour at 250° C.

The dicyandiamide is thus almost completely taken up by the triethylenetetramine with splitting off of ammonia, and there results a thickly-viscous slightly clouded liquid which can be used as a liquid hardening agent in the present process.

Example 7

10 parts by weight of the resin according to Example 5 are dissolved in 4 parts by weight of dibutylphthalate by heating. The solution cooled to room temperature, is homogeneously admixed with 2 parts by weight of the hardening agent prepared according to Example 6.

There results a resin solution which is readily applicable with a brush and which has to be used within about 2 hours. Adhesive joints made therewith show, after 20 hours, a shear strength of about 1.18 kg./mm.$^2$.

Example 8

10 parts by weight of the resin according to Example 5 are dissolved in 4 parts by weight of dibutylphthalate by heating. To the solution, cooled to room temperature, there is added 1 part by weight of triethylenetetramine which contains 0.1 part by weight of extremely finely divided caustic soda. Upon introduction into the ethylene oxide resin the caustic soda goes into solution.

The solution is readily applicable by brush and must be used within about 2 hours. Adhesive joints produced therewith attain after 20 hours shear strengths of about 0.7 kg./mm.$^2$.

Strips of sheet aluminum, adhesively joined together in this way, can be immersed in cold water for 7 days without appreciably losing any shear strength. If they are boiled for 8 hours in water, the shear strengths drop to about 50% of the original values. After boiling for 37 hours in water the shear strengths still amount to about 30% of the original values.

Example 9

10 parts by weight of the resin according to Example 5 are dissolved in 4 parts by weight of "Plastomoll P" by heating. To the cooled solution, there is added 1 part by weight of triethylenetetramine which contains 0.1 part by weight of caustic soda.

The mixture is applied onto aluminum sheets with a spatula and must be used up within ½ hour. Adhesive joints attain after 18 hours shear strengths of about 1.12 kg./mm.$^2$.

Example 10

10 parts by weight of the resin according to Example 5 are dissolved by heating in 4 parts by weight of methylcyclohexanol ester of methyladipic acid. To the cooled solution, there is added 1 part by weight of triethylenetetramine which contains 0.1 part by weight of caustic soda.

The mixture is applied with the spatula and must be used within 1 hour. After 17 hours shear strengths of about 0.9 kg./mm.$^2$ are attained.

Example 11

Into a mixture which contains 12 mols of glycerine dichlordihydrin and 127 mols of water for each 4.2 mols of dihydroxydiphenylpropane, 24 mols of caustic soda in the form of a 30% aqueous solution are allowed to run in at 60° C. within ¾ hour while stirring and with reflux cooling, condensation is continued for about ½ hour, the product is washed free of salts and alkali with water to which a small quantity of acetic acid is added, and drying is then effected by heating to 160° C. There is obtained a resin which is spreadable at ordinary temperature.

*Example 12*

10 parts by weight of the resin according to Example 11 are dissolved in 2 parts by weight of dibutylphthalate and 2 parts by weight of the hardening agent according to Example 6 are added.

There is formed a mass which is readily applicable with the spatula and which must be used within 4 hours.

After 24 hours, the shear strength amounts to about 1.26 kg./mm.$^2$.

*Example 13*

10 parts by weight of the resin according to Example 11 are heated with reflux cooling to 170° C. for 2½ hours with 4 parts by weight of tricresylphosphate and 0.02 part by weight of dicyandiamide. To the cooled homogeneous solution there is added 1 part by weight of triethylenetetramine. The mixture is well applicable with the brush and must be used within 4 hours. After 1 day, adhesive joints of shear strengths of 1.1 kg./mm.$^2$ are attained.

Instead of tricresylphosphate, dibutylphthalate may be used with substantially the same success.

*Example 14*

Various materials are glued together:

| Adhesive Agent According to Example— | Glued Materials | Hardening Time at Room Temperature, hrs. | Shear Strength, kg./mm.$^2$ |
|---|---|---|---|
| 2a | Glass/Glass | 24 | (1) |
| 2a | molded melamine resin/molded melamine resin. | 24 | (1) |
| 2a | molded melamine resin/Glass. | 24 | (1) |
| 2b | Brass/Brass | 24 | 0.93 |
| 2b | V2A-Steel/V2A-Steel $^2$ | 24 | 0.52 |
| 7 | Copper/Copper | 24 | 0.77 |
| 7 | Iron/Iron | 24 | 1.20 |

$^1$ Shear strength not determinable because the material broke.
$^2$ V2A-Steel is an iron alloy composed of iron, carbon, chromium and nickel (cf. "Korrosionstabellen Metallischer Werkstoffe," by Dr. Ing. Franz Ritter VDI, published by Julius Springer, Vienna, 1937, page 11, No. 378).

*Example 15*

Resins are prepared from 1–1.3 mols of dihydroxydiphenylpropane, 2 mols of epichlorhydrin and 2–2.2 mols of caustic soda in the presence of water in the manner described in (a) Example 1, (b) Example 5, and (c) Example 11. The resins which were prepared with small quantities of dihydroxydiphenylpropane, are somewhat softer in the cold than those prepared with larger quantities.

*Example 16*

10 parts by weight of each of the resins prepared according to Example 15 are severally dissolved in a mixture of 2 parts by weight of dibutylphthalate and 2 parts by weight of cyclohexanol by heating to about 80–100° C. and, after cooling, 1 part by weight of triethylenetetramine is added. Aluminum sheets glued together therewith have shear strengths up to 1.4 kg./mm.$^2$ As a result of the addition of cyclohexanol, the resins harden to entirely clear transparent masses of enhanced strength.

*Example 17*

Aluminum sheets are suspended for about 1 hour in an aqueous solution which contains 20% by weight of nitric acid and 20% by weight of potassium bichromate. The sheets become coated with a firmly adherent white layer. The sheets, thus prepared, are glued together with any one of the resin solutions according to Example 16. Shear strengths of 2.0–2.3 kg./mm.$^2$ are realized. By the production, in known manner, of an adherent spongy layer on the sheets, the adhesion of the adhesive agent is enhanced and thereby the shear strength is improved.

Similar values can be obtained by pretreating the sheets with solutions which contain 5–10% by weight of potassium permanganate and 10% by weight of sulfuric acid or 10% by weight of sulfuric acid and 20% by weight of potassium bichromate. Somewhat less favorable results were obtained by pretreatment of the sheets with 20% phosphoric acid.

*Example 18*

94 parts by weight of phenol, 10 parts by weight of water, and 5 parts by weight of half-normal sulfuric acid are heated under reflux, and into the mixture there are run, within the course of about 1¾ hours, 60 parts by weight of 30% aqueous formaldehyde solution, while stirring. Heating is continued for 3 more hours under reflux and with stirring. The formed methane resin is separated from the aqueous liquid and is washed twice with small quantities of water.

129 parts by weight of dichlorhydrin are added to this resin, the whole is heated to 65–70° C., and 266 parts by weight of 30% aqueous caustic soda solution are then run in within a period of 1 hour. Condensation is continued for 30 more minutes, and the resin is finally washed with water until it is free of alkali and salt, 5 parts by weight of glacial acetic acid being added to the next to the last wash water. The resin is dried in vacuo.

2 parts by weight of this resin are dissolved with 0.8 part by weight of tricresylphosphate by heating. After cooling, 0.2 part by weight of triethylenetetramine is added. The thus prepared adhesive must be introduced between the surfaces to be glued together within about 1 hour. After 3 days, shear strengths of about 0.6 kg./mm.$^2$ are obtained.

*Example 19*

A methylmethane resin is prepared from 94 parts by weight of phenol and 22 parts by weight of paraacetaldehyde in acid medium. This is converted, in a manner similar to that of Example 18, into an ethylene oxide resin with the aid of 129 parts by weight of dichlorhydrin and 80 parts by weight of caustic soda in the form of a 30% aqueous solution.

2 parts by weight of this resin are dissolved in 0.8 part by weight of dibutylphthalate. After cooling the solution, 0.15 part by weight of triethylenetetramine is added thereto. The obtained adhesive may be applied to the sheets with a brush within about 2½ hours. After 24 hours, shear strengths of about 0.2 kg./mm.$^2$ are attained.

*Example 20*

An ethylene oxide resin is prepared from 120 parts by weight of resorcinol and 260 parts by weight of dichlorhydrin in alkaline medium. 2 parts by weight of this resin are dissolved warm in 0.8 part by weight of tricresylphosphate. After cooling 0.1 part by weight of triethylenetetramine is added. The adhesive must be applied by means of a brush to the materials to be glued together within about 30 minutes. After 24 hours, shear strength is reduced to about 0.9 kg./mm.²

*Example 21*

10 parts by weight of the resin according to Example 5 are dissolved in 2 parts by weight of dibutylphthalate and 2 parts by weight of acetone by heating under reflux and stirring. After cooling, 1 part by weight of triethylenetetramine is added. The adhesive is then applied to plywood and roughened aluminum sheet by means of a roller, and the acetone is evaporated by standing for about 30–45 minutes. The sheet and wood are then joined together with the aid of clamps, vises or the like and then allowed to stand. After 3 days, shear strengths of about 0.46 kg./mm.² are obtained, there being partial breakage of the wood (not however, of the glued joint). After immersion for 92 hours in water, the shear strength is reduced to about 0.9 kg./mm.²

*Example 22*

5 parts by weight of the resin according to Example 1 and 5 parts by weight of the resin according to Example 11 are dissolved warm in 4 parts by weight of dibutylphthalate, and heated under a reflux for 3 hours at 170° C. After cooling, 2 parts by weight of triethylenetetramine are added. The gluings obtained with the adhesive reach shear strengths of about 1 kg./mm.²

*Example 23*

10 parts by weight of the resin according to Example 1 and 2 parts by weight of the resin according to Example 11 are dissolved by heating in 4.8 parts by weight of dibutylphthalate. After cooling, 2.4 parts by weight of the hardening agent prepared according to Example 6 are added. Shear strengths of about 1 kg./mm.² are realized with this adhesive.

*Example 24*

10 parts by weight of the resin according to Example 1 are dissolved by heating in 4 parts by weight of diethylaniline. 1 part by weight of triethylenetetramine is added to the cooled solution. Gluings produced with this adhesive show, after 2 days, shear strengths up to about 1 kg./mm.²

*Example 25*

11 parts by weight of p-phenylenediamine are heated to 200° C. with 30 parts by weight of triethylenetetramine, with reflux cooling. The p-phenylenediamine goes into solution but, upon cooling, it first crystallizes out again. Heating is then continued at 200° C. until, upon cooling a test specimen, no crystals or a very small quantity thereof appear, which is the case after about 3 hours. During the foregoing, ammonia escapes from the reflux cooler, and there remains behind a liquid mass which is useful as a hardening agent for the purposes of the present invention.

*Example 26*

10 parts by weight of the resin according to Example 1 together with 2 parts by weight of the resin according to Example 11 are dissolved warm in 4.8 parts by weight of dibutylphthalate, and 3 parts by weight of the hardening agent according to Example 25 are added to the cooled solution. Shear strengths of about 0.8–0.9 kg./mm.² are realized with the thus obtained adhesive.

*Example 27*

10 parts by weight of the resin according to Example 15 are dissolved in 2 parts by weight of dibutylphthalate and 2 parts by weight of cyclohexanol by heating to 80–100° C. After cooling to about 20° C., 1 part by weight of triethylenetetramine is added and the mixture is diluted with 2–4 parts by weight of anhydrous ethyl alcohol. Aluminum sheets are coated with this mixture. The sheets are allowed to stand open for 3–4 hours in order to permit the ethyl alcohol to evaporate. The sheets are heated in a drying chest for 1 hour at 200° C. The hardened layer is roughened with emery paper. The roughened surfaces are then coated with the above solution but without the addition of ethyl alcohol and are kept lightly clamped together for 24 hours at temperatures of about 30–40° C. Shear strengths of about 2.3–2.5 kg./mm.² can be obtained.

What we claim is:

1. An adhesive agent which consists of a hardenable unreacted mixture which is spreadable at 10 to 40° C., which mixture contains as essential components (a) a resinous ethylene oxide derivative of a phenol containing at least two phenolic hydroxy groups and which is free from other reactive substituents, said derivative carrying at least two ethylene oxide groups, (b) as a solvent for the ethylene oxide derivative a liquid hydrocarbon ester of a polybasic acid of the group consisting of phthalic acid, adipic acid, methyladipic acid and phosphoric acid and (c) a fluid hardening agent, and said hardening agent being non-volatile from the mixture with components (a) and (b) at said temperature.

2. An adhesive agent which consists of a hardenable unreacted mixture which is spreadable at 10 to 40° C., which mixture contains as essential components (a) a resinous ethylene oxide derivative of a 4,4′-dihydroxy-diphenyl-methane which is free from other reactive substituents and selected from the group consisting of 4,4′-dihydroxydiphenyl-methane, 4,4′-dihydroxydiphenyl-methyl-methane and 4,4′-dihydroxydiphenyl-dimethyl-methane, said derivative carrying at least two ethylene oxide groups, (b) as a solvent for the ethylene oxide derivative a liquid hydrocarbon ester of a polybasic acid of the group consisting of phthalic acid, adipic acid, methyladipic acid and phosphoric acid and (c) a fluid hardening agent, and said hardening agent being non-volatile from the mixture with components (a) and (b) at said temperature.

3. An adhesive agent which consists of a hardenable unreacted mixture which is spreadable at 10 to 40° C., which mixture contains as essential components (a) a resinous ethylene oxide derivative of 4,4′-dihydroxydiphenyl-dimethyl-methane, said derivative carrying at least two ethylene oxide groups, (b) as a solvent for the ethylene oxide derivative a liquid hydrocarbon ester of a polybasic acid of the group consisting of phthalic acid, adipic acid, methyladipic acid and phosphoric acid and (c) a fluid hardening agent, and said hardening agent being non-volatile from the mixture with components (a) and (b) at said temperature.

4. A composite rigid multi-part article, parts of which have interposed therebetween and in contact therewith and are adhesively united together by the hardened adhesive agent defined in claim 1.

5. A composite rigid multi-part article, parts of which have interposed therebetween and in contact therewith and are adhesively united together by the hardened adhesive agent defined in claim 2, the resultant joints having enhanced shear strength.

6. A composite rigid multi-part article, parts of which have interposed therebetween and in contact therewith and are adhesively united together by the hardened adhesive agent defined in claim 3, the resultant joints having enhanced shear strength.

7. An adhesive agent which consists of a hardenable unreacted mixture which is spreadable at 10 to 40° C., which mixture contains as essential components (a) a resinous ethylene oxide derivative of a phenol containing at least two phenolic hydroxy groups and which is free from other reactive substituents, said derivative carrying at least two ethylene oxide groups, (b) as a solvent for the ethylene oxide derivative a liquid hydrocarbon ester of a polybasic acid of the group consisting of phthalic acid, adipic acid, methyladipic acid and phosphoric acid and (c) a fluid hardening agent selected from the group consisting of triethylenetetramine, ethylene-diamine, hexamethylene-diamine, the product obtained by heating triethylene-tetramine with dicyandiamide with splitting off of ammonia, and the product obtained by heating triethylene-tetramine with p-phenylene-diamine with splitting off of ammonia.

8. An adhesive agent which consists of a hardenable unreacted mixture which is spreadable at 10 to 40° C., which mixture contains as essential components (a) a resinous ethylene oxide derivative of a 4,4'-dihydroxydiphenyl-methane which is free from other reactive substituents and selected from the group consisting of 4,4'-dihydroxydiphenyl - methane, 4,4' - dihydroxydiphenyl - methyl - methane and 4,4'-dihydroxydiphenyl-dimethyl-methane, said derivative carrying at least two ethylene oxide groups, (b) as a solvent for the ethylene oxide derivative a liquid hydrocarbon ester of a polybasic acid of the group consisting of phthalic acid, adipic acid, methyladipic acid and phosphoric acid and (c) a fluid hardening agent selected from the group consisting of triethylene-tetramine, ethylene-diamine, hexamethylene-diamine, the product obtained by heating triethylene-tetramine with dicyandiamide with splitting off of ammonia, and the product obtained by heating triethylene-tetramine with p-phenylene-diamine with splitting off of ammonia.

9. An adhesive agent which consists of a hardenable unreacted mixture which is spreadable at 10 to 40° C., which mixture contains as essential components (a) a resinous ethylene oxide derivative of 4,4' - dihydroxydiphenyl-dimethylmethane, said derivative carrying at least two ethylene oxide groups, (b) as a solvent for the ethylene oxide derivative a liquid hydrocarbon ester of a polybasic acid of the group consisting of phthalic acid, adipic acid, methyladipic acid and phosphoric acid and (c) a fluid hardening agent selected from the group consisting of triethylene - tetramine, ethylene - diamine, hexamethylene-diamine, the product obtained by heating triethylene-tetramine with dicyandiamide with splitting off of ammonia, and the product obtained by heating triethylene-tetramine with p-phenylene diamine with splitting off of ammonia.

10. An adhesive agent according to claim 1, wherein the liquid hydrocarbon ester is dibutyl phthalate.

11. An adhesive agent according to claim 1, wherein the liquid hydrocarbon ester is tricresyl phosphate.

12. An adhesive agent according to claim 1, wherein the liquid hydrocarbon ester is the methylcyclohexanol ester of methyladipic acid.

References Cited in the file of this patent

UNITED STATES PATENTS

| Number | Name | Date |
| --- | --- | --- |
| 1,019,407 | Baekeland | Mar. 5, 1912 |
| 2,318,184 | Rojas | May 4, 1943 |
| 2,324,483 | Castan | July 20, 1943 |
| 2,414,414 | Rhodes | Jan. 14, 1947 |
| 2,444,333 | Castan | June 29, 1948 |
| 2,469,684 | Dudley | May 10, 1949 |
| 2,479,342 | Gibbons et al. | Aug. 16, 1949 |
| 2,510,885 | Greenlee | June 6, 1950 |
| 2,512,996 | Bixler | June 27, 1950 |
| 2,585,115 | Greenlee | Feb. 12, 1952 |